Nov. 20, 1956  E. W. BERG ET AL  2,770,939
POWER ACTUATED REEL OPERATING MEANS
Filed Nov. 12, 1953  2 Sheets-Sheet 1
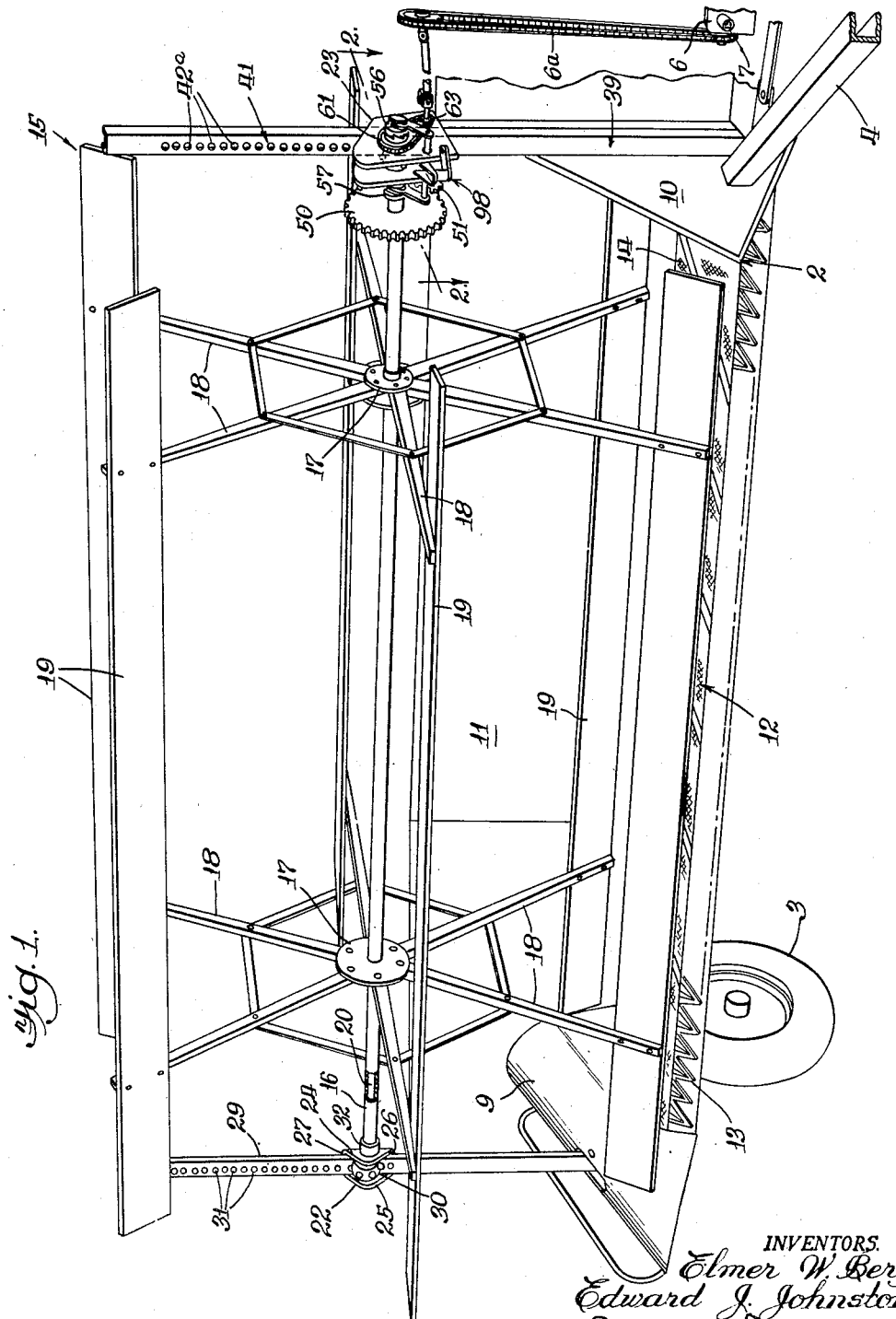
INVENTORS.
Elmer W. Berg
Edward J. Johnston
Paul O. Pipper
Atty.

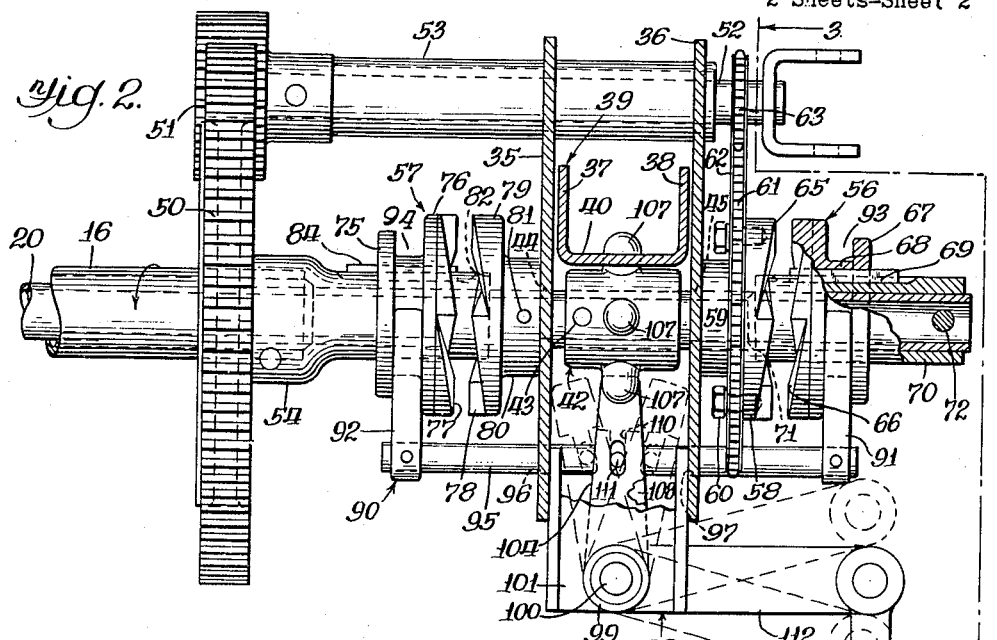

United States Patent Office 2,770,939
Patented Nov. 20, 1956

2,770,939

POWER ACTUATED REEL OPERATING MEANS

Elmer W. Berg, Wheaton, and Edward J. Johnston, Chicago, Ill., assignors to International Harvester Company, a corporation of New Jersey Application November 12, 1953, Serial No. 391,420

15 Claims. (Cl. 56—222)

This invention relates to the adjustment by power of an operating assembly of a harvester, and more specifically to the adjustment of the harvester reel by the power train driving the reel itself.

With the increased speed of operation of harvesters such as combines and windrowers and the like it is necessary to be able to rapidly adjust the height of the reel relative to the cutter bar and the platform of the harvester to meet changing field crop conditions. In prior art constructions adjustment of the reel is accomplished by a vertical tooth rack connected to the platform and extending upwardly to the reel support which carries a rotatable pinion meshing with the rack. Means for powering the reel upwardly in one direction by power derived from the rotating reel itself is known in the art, however, all prior devices depend upon gravity to lower the reel. Experience has dictated, however, that for the reel to lower by gravity requires accurate machining of parts which is not tolerable in the farm implement field for such purposes inasmuch as this would entail prohibitive costs. Furthermore, the supports and the racks mounting the reel are subjected to twisting and turning strains which somewhat misalign the parts so that they do not work freely and tend to bind. In prior art devices such automatic lowering of the reel by gravity is theoretical and not based upon actual realization in fact.

The principal object of the invention is to devise a power drive for the reel in both raising and lowering directions.

A further object of the invention is to devise a simple power drive incorporating alternatively energizable clutch means for driving the reel by one of the clutch means upwardly and by the other downwardly.

A further important object resides in means for immobilizing the adjusting device so that the adjusted position of the reel may be secured; and, in this respect, it is a further object to coordinate the immobilizing means with the control means for the power transmitting means in such manner that the immobilizing means is rendered ineffective when the power-transmitting means is conditioned to transfer power from the reel drive to the adjustable device.

A still further object of the invention is to devise an adjusting device in the form of a conversion unit whereby the power transmitting means may be readily attached to a harvester in place of the manually operated devices heretofore provided, and without materially altering the prior structure.

These and other objects will become more apparent from the specification and the drawings wherein:

Figure 1 is a perspective view with parts broken away and in section of the forward portion of a harvester showing the harvester frame, platform, rotating reel, and the improved adjusting device.

Figure 2 is a horizontal sectional view on a large scale being substantially on the line 2—2 of Figure 1 with parts broken away, and Figure 3 is a side sectional view of the structure shown in Figure 2 taken substantially on line 3—3 of Figure 2.

The windrow harvester illustrated in the drawings is intended merely to represent one type of harvester in which the invention may be used but is not intended to exclude other harvesting or like machines to which the principles of the invention may be applicable. The harvester illustrated comprises a platform structure 2 carried at each end on wheels 3 only one of which is shown in Figure 1. The harvester includes a forwardly extending draft frame 4 by means of which it may be connected to a tractor or other draft vehicle.

Various components of the harvester have their source of power in a gear box 6 which in turn obtains power from a propeller shaft 7 connectable at its forward end to the power take off shaft of the vehicle which propels the machine.

The windrower includes suitable framework in the form of side sheets 9 and 10 and a rear panel 11 which make up the harvester platform generally designated 12, across the front of which extends a cutter bar 13 in the usual manner. Grain cut by the cutter bar 13 is conveyed laterally by conveyor 14 which discharges the crop in a windrow.

Cutting of the grain by the cutter bar 13 is assisted by means of a rotating reel, generally indicated 15, which comprises a hollow reel shaft or pipe 16, a pair of hub elements 17, 17 spaced axially and fixed to the pipe 16, a plurality of arms 18, 18 extending radially from the hubs, and a plurality of reel bats 19, 19 at the outer ends of and interconnecting related pairs of arms 18, 18. The reel pipe 16 is disposed transversely across and above the platform 12 and is rotatable about a transverse shaft 20 telescoped in pipe 16. The opposite ends of the shaft 20 are supported by reel supports 22 and 23 as seen in Figure 1.

The member 22 comprises a U-shaped bracket 24 including a pair of laterally spaced upright ears 25 and 26 and an interconnecting web 27, the web 27 laying against the back side of an upright rack member 29 which, at its lower end, is connected to the paneling 9 and the framework 2 of the harvester platform in conventional manner. The ears or lugs 26 and 25 are disposed along the inboard and outboard edges respectively of the rack member and project forwardly therefrom and journal the shaft 20 through aligned openings therein (not shown), and the shaft 20 is keyed to a pinion 30 which is disposed between lugs 25 and 26 and meshes with the perforations 31, 31 in the rack member number 29. It will be understood that the bracket 24 is slidable vertically along the rack, standard or post 29 attendant to up and down movements of the reel. The inboard side of the plate or lug 26 of the bracket 24 is provided with a transverse bearing 32 which journals the adjacent end of the pipe 16 of the reel.

The means for supporting the opposite end of the shaft member 20 includes the reel support 23 which is arranged for adjustment vertically with respect to the platform. The bracket member 23 has the pair of upright laterally spaced side plates 35 and 36 flanking opposite sides or lateral flanges 37 and 38 of an upright standard or post generally designated 39, the post 39 being connected at its lower end to the paneling 10 and related portion of the platform framework 2. It will be seen from a consideration of Figure 2 that the post 39 is U-shaped in horizontal cross-section and that the inboard and outboard flanges 37 and 38 are interconnected by a transverse forward web 40, which, at its upper portion, is provided with a rack 41 in the form of a series of vertically spaced perforations 42a, 42a through the wall 40, said perforations meshing with companion teeth on a pinion 42 as best seen in Figure 2, said pinion 42 being connected as by a pin 43 to the opposite end of the shaft 20 for rotation therewith attendant to raising and lowering of the reel. The pinion 42 is disposed forwardly of the wall 40 between the side plates 35 and 36 of the bracket 23 and said plates 35 and 36 journal the shaft 20 therethrough as best seen at 44 and 45 in Figure 2.

The shaft 16 is connected to a coaxial reel driving member in the form of a gear 50 meshing with a small gear 51 which is connected to a counterrotating countershaft 52 which is journalled in a bearing 53 generally parallel to the shafts 16 and 20, the bearing 53 being connected to the plates 35 and 36.

The shaft 16 extends into and is connected for rotation with a coaxial sleeve 54 (Figure 2) which is journalled on the shaft 20.

The reel shaft 20 mounts clutches or selectively connectable drive transmitting means 56 and 57 at opposite sides of the post 39 outwardly of the plates 36 and 35, respectively. The clutch 56 comprises a driving part or section 58 which includes a hub 59 rotatively mounted on the shaft 20 and connected, as by bolts 60, to a sprocket 61 which is driven by chain 62 from a sprocket 63 connected to the countershaft or driving shaft 52 for constant rotation therewith. It will be noted that the drive transmitting means 61, 62, and 63 are codirectionally rotational, that is to rotate the clutch element 58 in the same direction with the shaft 52. The clutch element 58 is provided with a toothed face 65 disposed in cooperative relationship with a toothed, opposed, resilient disc 66 of the driven clutch part or section 67 of the clutch 56, said part 67 including a hub 68 which is fastened to disc 66 and axially slidable relative to the shaft 20 toward the member 58 for engagement therewith and away from said member 58 for disengagement with respect thereto, the hub 68 being keyed at 69 to an axial sleeve 70 which passes through the hub and at its inner end abuts as at 71 against the member 58 to prevent axial movement thereof, the sleeve 70 being pinned for rotation with the shaft 20 by a pin 72.

The clutch member 57 comprises a hub portion 75 which is axially slidably mounted upon the sleeve member 54 and said hub portion is provided with an annular mounting plate 76 which carries a resilient toothed clutch means 77 disposed in opposing relationship to a companion clutch face 78 of the driven clutch part 79 of the clutch 57, and said part 79 having a hub 80 connected by pin 81 to the shaft 20 for rotation therewith. It will be seen from a consideration of Figure 2 that the bearing 54 abuts as at 82 against the driven clutch part or section 79 to prevent axial movement thereof and that said clutch part 79 seats against the outer side of the plate 35 of the bracket 23. The driving clutch member or section 75 is keyed as at 84 to the sleeve 54 for rotation therewith and with the shaft 16.

The clutches 56 and 57 are interconnected by operating linkage generally indicated 90 and including shifting forks 91 and 92 which extend into annular grooves 93 and 94 provided respectively in the hub portions of the clutch element 67 and 75 of the clutches 56 and 57. The forks 91 and 92 are interconnected by a crossrod 95 which is slidably mounted through openings 96 and 97 in the plates 35 and 36 for movement axially generally parallel to the shaft 20.

As seen in Figure 2, the position of the operating linkage is shown in neutral wherein the clutches 56 and 57 are both disengaged. The rod or link 95 is operable by a bell crank operating lever generally designated 98 pivoted at its elbow 99 on an axis extending substantially perpendicular to the shaft 20 by a pin 100 passing through upper and lower mounting plates 101 and 102 extending between and connected to the plates 35 and 36 of the bracket 23 forwardly of the sprocket 42 and the standard 39. The lever 98 comprises a first leg portion 104 which extends rearwardly from the elbow 99 in a plane intersecting the sprocket 42, said leg 104, in the neutral position of the lever being centered between the plates 35 and 36 and extending under a tooth 107 of the gear 42 in holding relationship thereto to prevent the gear from rotating in a downward direction whereby said leg 104 serves with said rack as a latch member, lock or keeper for locking the reel in adjusted position. The lever 98 comprises a second leg portion 108 extending from the elbow 99 in substantially vertical alignment with the leg 104 over the shaft or link 95 and thereat provided with a bifurcated end portion 109 defining a slot 110 receiving an upstanding pin 111 therethrough, said pin 111 being fixed to the shaft 95 and extending radially therefrom. It will be appreciated that the leg 108 constitutes a shifting member for longitudinal or axial shifting of the link 95 between the positions shown in phantom lines in Figure 2. The lever 98 comprises a leg 112 extending laterally from said hub or elbow 99 and the outer end of the leg 112 is connected to a manipulating assembly generally designated 113 and which may include an actuating rod 114 operatively associated and slidably carried on mounting bracket 115 which includes a position indicia designated 116 cooperable with a position indicator in the form of a pointer 117 on the rod which would indicate to the operator the disposition of an actuating linkage for the clutches. The indicator 116 may, for example, indicate U for up, N for neutral, and D for down.

Operation of the device

In operation the shaft 52 is rotated from the gear box 6, by the drive transmitting means 6a illustrated in Figure 1 which includes appropriate shafting and belts and pulleys. The rotation of the shaft 52 is in the opposite direction to the rotation of the shaft 16 as established by the reversing drive means 50, 51. The rotation of the shaft 52 and the sprocket 61 and associated clutch member 65 is codirectional in that both rotate in the same direction as established by the drive transmitting means 61, 62, and 63. It will be noted that the sprocket 61 is substantially larger than the sprocket 63 in order to reduce the speed of rotation of the sprocket 61. Assuming that the shafts 52 and 16 rotate in directions shown by the arrows in Figure 3 and further assuming that the operating linkage is in neutral position as shown in solid lines in Figure 2, in order to cause the reel to descend the operator pulls the rod 114 forwardly until the pointer 117 aligns with the letter D, the lever 98 being rotated in a clockwise direction as seen in Figure 2 to the position shown in phantom lines whereat the free extremity of the leg 104 is disengaged from the related gear tooth 107. Simultaneously the operating element 108 is shifted to the right which also shifts the rod 95 to the right whereby axially moving the clutch member 75 of the clutch 57 to the right to engaged relationship with the clutch member 79. It will be noted that the resilient clutch face element 77 affords a slip between the clutch elements 75 and 79 to an extent sufficient to allow the leg 104 to clear or completely disengage the associated tooth 107 of the sprocket 42. Simultaneously the clutch element 67 is shifted to the right completely out of the engagement with the clutch element 65. Power is then transmitted from the shaft 16 to the bearing 54 to the clutch member 75 and to the clutch element 79 to the shaft 20 which rotates the gear 42 in a counterclockwise direction (Figure 3) whereby the gear 42 is caused to descend along the rack 41. Upon the reel reaching the position desired by the operator, the operator then moves the rod 114 rearwardly to a position whereat the pointer 117 aligns with the letter N on the indicia plaque 116 whereby the lever 98 is rotated in a counterclockwise direction (Figure 2) to the solid position shown in Figure 2 whereat both clutches are disengaged.

If the operator should desire to raise the reel he will move the rod 114 rearwardly to a position aligning the indicator 117 with the letter U on the plate 116, the lever 98 being rotated from its neutral position in a counter-clockwise direction (Figure 2) to a point where the leg 104 is disengaged from the teeth 107 of the gear 42 and it will be understood that immediately prior to said disengagement the resilient portion 66 of the driven clutch part 67 of the clutch 56 slippingly engages with the face 65 and upon the leg 104 of the lever 98 being completely disengaged from the gear 42 the clutch part 67 is completely engaged with the clutch part 58 and driven thereby in a clockwise direction as seen in Figure 3 whereby the sleeve 70 and the shaft 20 is driven in a clockwise direction thus driving the gear 42 in a clockwise direction causing it to ascend the standard 39. It will be appreciated that both ends of the reel ascend or descend together inasmuch as the gears 42 and 30 track together in their respective racks.

When the operator has the reel at the heights he desires, he merely pulls the rod 114 to position registering the indicator 117 with the letter N whereupon the lever 98 is again disposed in the position shown in solid lines in Figure 2 and both of the clutches are disengaged.

It will be appreciated that a novel power drive arrangement for raising and lowering the reel from the power transmission driving the reel is obtained and it will be further understood that a specific form of disclosure is merely by way of illustration and not limitation and that various forms of the invention will suggest themselves within the scope of the appended claims.

What is claimed is:

1. For harvesters of the type having a platform above which is carried for vertical adjustment a support on which is mounted a reel structure including a rotatable reel having an outwardly projecting shaft and a reel-driving element concentric with the reel and shaft for rotating the reel relative to the shaft and wherein vertical adjustment of the reel is effected by a rack connected to the platform and extending upwardly adjacent to the shaft and in axially spaced relation to the reel driving element, the improvement comprising: means including a pinion fixed to the shaft in meshing engagement with the rack for rotation with said shaft relative to the reel driving element; a continuous running driving countershaft journaled on said support; means continuously drivingly interconnecting said reel driving element with said driving countershaft in counterrotating relationship; and a selectively connectable drive transmitting means on said element and said shaft for rotating the shaft therewith and said pinion in one direction on said rack for moving said reel in one direction and a selectively connectable drive transmitting means on said countershaft and said shaft for rotating said shaft and said pinion in the reverse direction to said one direction for moving the reel in an opposite direction.

2. The combination according to claim 1 and operating means operatively interconnected on both of said drive transmitting means for alternatively connecting one of said means while disconnecting the other thereof.

3. For harvesters of the type having a platform above which is carried for vertical adjustment a support on which is mounted a reel structure including a rotatable reel having an outwardly projecting shaft member and a reel-driving element concentric with the reel and shaft member for rotating the reel relative to the shaft member and wherein vertical adjustment of the reel is effected by a rack connected to the platform and extending upwardly adjacent to the shaft and in axially spaced relation to the reel driving element, the improvement comprising: means including a pinion fixed to the shaft member in mesh with said rack for rotation with said shaft member relative to the reel driving element; a continuous running driving countershaft carried by said support; a first clutch having a driving clutch part connected for rotation with said reel driving element and a driven clutch part rotatable with and drivingly connected to said shaft member, at least one of said clutch parts being movable toward and away from the other for selective engagement and disengagement relative to each other, a second clutch having mating clutch sections mounted upon said shaft member, one of said clutch sections connected to said shaft member and the other freely rotatable thereon, said sections relatively movable toward and away from each other axially of said shaft into selective engaged and disengaged positions, means drivingly interconnecting said other clutch section with said countershaft for rotation in the same direction therewith, and means for selectively moving said driven clutch part into clutching engagement with said driving clutch part while simultaneously moving said one clutch section out of engagement with the other clutch section and vice versa.

4. The combination according to claim 3 and said last mentioned means comprising an operating linkage interconnecting one of said clutch sections with one of said clutch parts for movement together, said linkage having an intermediate neutral position whereat said one clutch section and said one clutch part are disposed in disengaged relation to the related clutch section and clutch part.

5. The combination according to claim 4 and said operating linkage including a latch member pivotally mounted on said support on an axis transversely of said shaft member of said reel and having a portion swingable about said axis transversely of said pinion and engageable therewith in the neutral position of said linkage to lock said pinion against rotation.

6. In a device of the class described, a frame structure including an upright rack, a reel shaft extending transversely of said rack and having a pinion fixed thereto in mesh with said rack, a bracket slidably mounted on said rack for up and down movement thereupon and journalling said shaft, a reel having a driving element concentric with said shaft and rotatably mounted thereupon, a continuous running countershaft rotatably mounted upon said bracket, means counterrotationally drivingly interconnecting said element and said countershaft, a pair of clutches each having cooperatively arranged driven and driving parts concentrically mounted about said shaft, the driving part of one clutch connected to said element and the driving part of the other clutch rotatably journalled on said shaft, drive transmitting means operatively interconnecting said countershaft and said driving part of said other clutch so that they both rotate in the same direction, the driven parts of both clutches connected for rotation with said shaft, at least one clutch part of each clutch movable axially of the shaft into engaging and disengaging positions with respect to the related other clutch part, and operating linkage connected to the movable clutch parts for selectively moving the same into engaging-disengaged positions.

7. The invention according to claim 6 and further characterized in that said bracket comprises a pair of interconnected side plates flanking said rack member, and said operating linkage includes a rod positioned generally parallel to said shaft and slidably mounted in openings in said plates and having ends projecting outwardly of the opposite sides of said bracket, and said clutches disposed, respectively adjacent to opposite ends of said rod with the movable part of each clutch operatively connected to the adjacent end of the rod for movement therewith axially of said shaft, the movable clutch parts of respective clutch elements disposed outwardly of the other clutch parts whereby movement of said rod engages one clutch part of one clutch with the associated part thereof while disengaging the one movable clutch part of the other clutch with the other associated part thereof and vice versa.

8. In a power driven adjusting means for lowering and raising a reel having a generally horizontal center pipe with a shaft extending therethrough; support means for the reel comprising a pair of upright standards at opposite ends of said shaft, a pinion fixed on each end of said shaft, a rack on each standard in mesh with the associated pinion, a bracket operatively associated with each standard for up and down movement thereon and journalling the adjacent end of the shaft and holding the pinion thereon in mesh with the related rack; and power means for selectively rotating said shaft in either direction to track said pinions on said racks and comprising a continuous rotating countershaft rotatably mounted upon one of said brackets, drive transmitting means drivingly interconnecting said countershaft and said pipe to rotate in reverse directions; selectively connectable drive transmitting means between said countershaft and said shaft for rotating the shaft in one direction, and selectively connectable drive transmitting means between said shaft and said pipe for rotating said shaft in the reverse direction.

9. The invention according to claim 8 and an operating linkage operatively associated with both of said drive transmitting means for alternatively connecting one of said drive transmitting means while disconnecting the other of said drive transmitting means or for disposing both of said drive transmitting means in neutral.

10. The invention according to claim 8 and further characterized by each of said drive transmitting means comprising a clutch with a pair of selectively mateable clutch parts mounted upon said shaft, one clutch part of each clutch being connected for rotation with the shaft and the other clutch part of one of said clutches connected for rotation with said pipe and the other clutch part of the other of said clutches drivingly connected to said countershaft for rotation in the same direction therewith.

11. The invention according to claim 8 and further characterized by each of said drive transmitting means comprising a clutch with a pair of selectively mateable clutch parts mounted upon said shaft, one clutch part of each clutch being connected for rotation with the shaft and the other clutch part of one of said clutches connected for rotation with said pipe and the other clutch part of the other of said clutches drivingly connected to said countershaft for rotation in the same direction therewith, and operating linkage comprising a member slidably mounted upon one of said brackets and having opposite ends operatively associated with an axially movable clutch part of each clutch for moving the same toward and away from its mateable clutch part.

12. The invention according to claim 8 and further characterized by each of said drive transmitting means comprising a clutch with a pair of selectively mateable clutch parts mounted upon said shaft, one clutch part of each clutch being connected for rotation with the shaft and the other clutch part of one of said clutches connected for rotation with said pipe and the other clutch part of the other of said clutches drivingly connected to said countershaft for rotation in the same direction therewith, and operating linkage comprising a member slidably mounted upon one of said brackets and having opposite ends operatively associated with an axially movable clutch part of each clutch for moving the same toward and away from its mateable clutch part and said member having a limit of movement in one direction whereat engaging an axially movable clutch part of one clutch with its associated clutch part, and said member having a limit of movement in the opposite direction whereat engaging the axially movable clutch part of the other clutch with its associated clutch part, said member having an intermediate position between said limits whereat both clutches are disengaged.

13. The invention according to claim 8 and further characterized by each of said drive transmitting means comprising a clutch with a pair of selectively mateable clutch parts mounted upon said shaft, one clutch part of each clutch being connected for rotation with the shaft and the other clutch part of one of said clutches connected for rotation with said pipe and the other clutch part of the other of said clutches connected for rotation in the same direction with said countershaft, and operating linkage comprising a member slidably mounted upon one of said brackets and having opposite ends operatively associated with an axially movable clutch part of each clutch for moving the same toward and away from its mateable clutch part and said member having a limit of movement in one direction whereat engaging an axially movable clutch part of one clutch with its associated clutch part, and said member having a limit of movement in the opposite direction whereat engaging the axially movable clutch part of the other clutch with its associated clutch part, said member having an intermediate position between said limits whereat both clutches are disengaged, and a lever for shifting said member pivoted on said one bracket on an axis transverse to said shaft and having a leg portion operatively connected to said member and having another leg portion disposed in a plane intersecting the adjacent pinion and positionable in said intermediate position of said member in locking engagement with said last-mentioned pinion.

14. The invention according to claim 8 and further characterized by each of said drive transmittting means comprising a clutch with a pair of selectively mateable clutch parts mounted upon said shaft, one clutch part of each clutch being connected for rotation with the shaft and the other clutch part of one of said clutches connected for rotation with said pipe and the other clutch part of the other of said clutches connected for rotation in the same direction with said countershaft, and operating linkage comprising a member slidably mounted upon one of said brackets and having opposite ends operatively associated with an axially movable clutch part of each clutch for moving the same toward and away from its mateable clutch part and said member having a limit of movement in one direction whereat engaging an axially movable clutch part of one clutch with its associated clutch part, and said member having a limit of movement in the opposite direction whereat engaging the axially movable clutch part of the other clutch with its associated clutch part, said member having an intermediate position between said limits whereat both clutches are disengaged, and a lever for shifting said member pivoted on said one bracket on an axis transverse to said shaft and having a leg portion operatively connected to said member and having another leg portion disposed in a plane intersecting the adjacent pinion and positionable in said intermediate position of said member in locking engagement with said last-mentioned pinion and said one bracket comprising a pair of upright side plates flanking the associated standard and receiving the adjacent pinion therebetween, and said other leg of said lever extending between said plates and at one limit of movement of said member abutting against one of said plates and in the opposite limit of movement abutting the other of said plates.

15. In a power drive for a reel mounted for up and down movement upon a standard, the combination of a driving member for the reel, a horizontal shaft extending therethrough in transverse relation to the standard, a pinion connected to the shaft, a rack on said standard meshing with said pinion whereby during up and down movements of the reel upon said standard said pinion is caused to rotate with said shaft, a bracket slidably mounted on the standard for up and down movement thereon and journaling said shaft with said pinion in meshing relation with said rack, a continuous running countershaft journaled on said bracket, a pair of mating gears connected respectively to said driving member for the reel and said countershaft, clutch means concentric with said shaft and including a first clutch having a driving part freely rotatable on the shaft and a driven part keyed for rotation with the shaft, a drive operatively interconnecting said driving part with said countershaft for rotation therewith, a second clutch having driving and driven parts drivingly connected respectively to said driving member and said shaft, one of the parts of each clutch being alternatively connectible with the other part of the related clutch for transmitting drive from the related driving part to the shaft for rotating the same to power drive the same up or down said standard.

References Cited in the file of this patent

UNITED STATES PATENTS

| | | |
|---|---|---|
| 479,848 | Schubert | Aug. 2, 1892 |
| 1,985,394 | Anderson | Dec. 25, 1934 |
| 2,572,700 | Chapman et al. | Oct. 23, 1951 |

FOREIGN PATENTS

| | | |
|---|---|---|
| 616,107 | Great Britain | Jan. 17, 1949 |